(12) United States Patent
Haeger et al.

(10) Patent No.: US 8,470,433 B2
(45) Date of Patent: Jun. 25, 2013

(54) TRANSPARENT DECORATABLE MULTILAYER FILM

(75) Inventors: Harald Haeger, Luedinghausen (DE); Michael Beyer, Raesfeld (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 381 days.

(21) Appl. No.: 11/816,588

(22) PCT Filed: Jan. 4, 2006

(86) PCT No.: PCT/EP2006/050037
§ 371 (c)(1),
(2), (4) Date: Aug. 17, 2007

(87) PCT Pub. No.: WO2006/087249
PCT Pub. Date: Aug. 24, 2006

(65) Prior Publication Data
US 2008/0213552 A1    Sep. 4, 2008

(30) Foreign Application Priority Data

Feb. 19, 2005    (DE) .................. 10 2005 007 663

(51) Int. Cl.
*B32B 27/34* (2006.01)
*B32B 7/02* (2006.01)

(52) U.S. Cl.
USPC .............. 428/212; 428/216; 428/474.4

(58) Field of Classification Search
USPC .. 428/213, 474.7, 423.1–423.7, 474.4–476.1, 428/478.2; 525/7, 7.1, 7.4; 526/329–329.1
See application file for complete search history.

(56) References Cited

U.S. PATENT DOCUMENTS

| | | | |
|---|---|---|---|
| 3,950,281 A * | 4/1976 | Usamoto et al. .............. 525/211 |
| 4,584,348 A * | 4/1986 | Nagano .......................... 525/207 |
| 5,313,987 A | 5/1994 | Rober et al. |
| 5,348,804 A * | 9/1994 | Vasselin et al. ............. 428/423.1 |
| 5,404,915 A | 4/1995 | Mugge et al. |
| 5,437,755 A | 8/1995 | Lavorel et al. |
| 5,500,263 A | 3/1996 | Rober et al. |
| 5,512,342 A | 4/1996 | Rober et al. |
| 5,554,426 A | 9/1996 | Rober et al. |
| 5,762,849 A | 6/1998 | Argast et al. |
| 5,798,048 A | 8/1998 | Ries |
| 5,858,492 A | 1/1999 | Roeber et al. |
| 6,090,459 A | 7/2000 | Jadamus et al. |
| 6,161,879 A | 12/2000 | Ries et al. |
| 6,306,967 B1 | 10/2001 | Spyrou et al. |
| 6,335,101 B1 | 1/2002 | Haeger et al. |
| 6,355,358 B1 | 3/2002 | Boer et al. |
| 6,391,982 B1 | 5/2002 | Haeger et al. |
| 6,407,182 B1 | 6/2002 | Maul et al. |
| 6,428,866 B1 | 8/2002 | Jadamus et al. |
| 6,451,395 B1 | 9/2002 | Ries et al. |
| 6,528,137 B2 | 3/2003 | Franosch et al. |
| 6,538,073 B1 | 3/2003 | Oenbrink et al. |
| 6,579,581 B2 | 6/2003 | Bartz et al. |
| 6,660,796 B2 | 12/2003 | Schueler et al. |
| 6,677,015 B2 | 1/2004 | Himmelmann et al. |
| 6,680,093 B1 | 1/2004 | Ries et al. |
| 6,726,999 B2 | 4/2004 | Schueler et al. |
| 6,766,091 B2 | 7/2004 | Beuth et al. |
| 6,783,821 B2 | 8/2004 | Ries et al. |
| 6,793,997 B2 | 9/2004 | Schmitz |
| 6,794,048 B2 | 9/2004 | Schmitz et al. |
| 7,025,842 B2 | 4/2006 | Monsheimer et al. |
| 7,135,525 B2 | 11/2006 | Petter et al. |
| 7,148,286 B2 | 12/2006 | Baumann et al. |
| 7,175,896 B2 | 2/2007 | Schmitz et al. |
| 7,317,044 B2 | 1/2008 | Monsheimer et al. |
| 2001/0018105 A1 | 8/2001 | Schmitz et al. |
| 2002/0082352 A1 * | 6/2002 | Schmitz et al. ................ 525/179 |
| 2002/0142118 A1 | 10/2002 | Schmitz et al. |
| 2002/0179888 A1 * | 12/2002 | Montanari et al. ............ 252/500 |
| 2003/0072987 A1 | 4/2003 | Ries et al. |
| 2003/0124281 A1 | 7/2003 | Ries et al. |
| 2003/0173707 A1 * | 9/2003 | Becker et al. ............. 264/272.11 |

(Continued)

FOREIGN PATENT DOCUMENTS

| EP | 0 622 183 | 11/1994 |
|---|---|---|
| EP | 0 779 084 | 6/1997 |
| EP | 1 329 481 | 7/2003 |

OTHER PUBLICATIONS

U.S. Appl. No. 12/037,465, filed Feb. 26, 2008, Omeis, et al.

(Continued)

*Primary Examiner* — Maria Veronica Ewald
*Assistant Examiner* — Prashant J Khatri
(74) *Attorney, Agent, or Firm* — Oblon, Spivak, McClelland, Maier & Neustadt, L.L.P.

(57) ABSTRACT

A multi layer film which comprises the following layers:

I. an upper layer composed of a polyamide molding composition which is transparent at the selected layer thickness, and II. a lower layer composed of a polyamide molding composition which comprises the following components:

a) from 70 to 99% by weight of a polyamide selected from a group of polyamides and copolyamides, as described, b) from 1 to 30% by weight of a copolymer which contains units of the following monomers:

α) from 20 to 94.5% by weight of one or more α-olefins having from 2 to 12 carbon atoms, β) from 5 to 79.5% by weight of one or more acrylic compounds, γ) from 0 to 50% by weight of an olefinically unsaturated epoxide, carboxylic anhydride, carboximide, oxazoline, or oxazinone, and has good printability and adhesive-bondability and transparency, and can be used, for example, as an overcoating for skis.

18 Claims, No Drawings

U.S. PATENT DOCUMENTS

| | | |
|---|---|---|
| 2003/0212174 A1 | 11/2003 | Peirick et al. |
| 2004/0102539 A1 | 5/2004 | Monsheimer et al. |
| 2004/0106691 A1 | 6/2004 | Monsheimer et al. |
| 2004/0137228 A1 | 7/2004 | Monsheimer et al. |
| 2004/0140668 A1 | 7/2004 | Monsheimer et al. |
| 2004/0202908 A1 | 10/2004 | Schmitz et al. |
| 2004/0232583 A1 | 11/2004 | Monsheimer et al. |
| 2005/0027050 A1 | 2/2005 | Monsheimer et al. |
| 2006/0014035 A1* | 1/2006 | Montanari et al. ......... 428/474.4 |
| 2006/0071359 A1 | 4/2006 | Monsheimer et al. |
| 2006/0078752 A1 | 4/2006 | Schmitz et al. |
| 2006/0083882 A1 | 4/2006 | Schmitz et al. |
| 2006/0099478 A1 | 5/2006 | Schmitz et al. |
| 2006/0100323 A1 | 5/2006 | Schmidt et al. |
| 2006/0134419 A1 | 6/2006 | Monsheimer et al. |
| 2006/0141188 A1 | 6/2006 | Schmitz et al. |
| 2006/0189784 A1 | 8/2006 | Monsheimer et al. |
| 2006/0202395 A1 | 9/2006 | Monsheimer et al. |
| 2006/0223928 A1 | 10/2006 | Monsheimer et al. |
| 2006/0244169 A1 | 11/2006 | Monsheimer et al. |
| 2006/0281873 A1 | 12/2006 | Alting et al. |
| 2006/0292387 A1 | 12/2006 | Kuhmann et al. |
| 2007/0013108 A1 | 1/2007 | Monsheimer et al. |
| 2007/0036998 A1 | 2/2007 | Dowe et al. |
| 2007/0104971 A1 | 5/2007 | Wursche et al. |
| 2007/0126159 A1 | 6/2007 | Simon et al. |
| 2007/0148388 A1 | 6/2007 | Kuhmann et al. |
| 2007/0166560 A1 | 7/2007 | Wursche et al. |
| 2007/0182070 A1 | 8/2007 | Monsheimer et al. |
| 2007/0183918 A1 | 8/2007 | Monsheimer et al. |
| 2007/0197692 A1 | 8/2007 | Monsheimer et al. |
| 2007/0232753 A1 | 10/2007 | Monsheimer et al. |
| 2007/0238056 A1 | 10/2007 | Baumann et al. |
| 2008/0116616 A1 | 5/2008 | Monsheimer et al. |
| 2008/0166496 A1 | 7/2008 | Monsheimer et al. |
| 2008/0217821 A1 | 9/2008 | Goring et al. |
| 2008/0249237 A1 | 10/2008 | Hager et al. |
| 2010/0221551 A1 | 9/2010 | Wursche et al. |
| 2012/0094116 A1 | 4/2012 | Wursche et al. |

OTHER PUBLICATIONS

U.S. Appl. No. 12/438,142, filed Feb. 20, 2009, Luetzeler, et al.
U.S. Appl. No. 12/438,364, filed Feb. 23, 2009, Luetzeler, et al.
U.S. Appl. No. 12/373,547, filed Jan. 13, 2009, Luetzeler, et al.
U.S. Appl. No. 12/302,298, filed Nov. 25, 2009, Alting, et al.
U.S. Appl. No. 12/515,543, filed May 20, 2009, Wursche, et al.
Michael Beyer, et al., "Schon Und Robust-Schutz-Und Dekorfolien Aus Polyamiden", Kunststoffe, vol. 90, Jan. 2000, pp. 98-101.
U.S. Appl. No. 13/150,683, filed Jun. 1, 2011, Alting, et al.

* cited by examiner

TRANSPARENT DECORATABLE MULTILAYER FILM

The invention relates to multilayer films which can be decorated and are composed of at least two different polyamide molding compositions.

Semicrystalline polyamide molding compositions can be extruded to give films and have good transparency at layer thicknesses of up to 1 mm. These films can be decorated via thermal sublimation printing; they can be used, for example, for decoration of snowboards, of skis, of tennis rackets, of automobile parts, of furniture, and of household articles and the like, in layer thicknesses of from about 0.05 to 1 mm. The prior art is set out in the article by M. Beyer and J. Lohmar, Kunststoffe 90 (2000) 1, pp. 98-101, based on corresponding molding compositions from Degussa AG.

Screen printing is a relatively low-cost and relatively versatile method for decoration of films. In one variant of screen-printing inks, these are solvent-based inks. One typical mixing specification for a screen-printing ink is formulated from the pigment, additives, solvents, and binders. Suitable selection of the solvent can affect the adhesion of the ink to the printed matrix, meaning that the solvent solvates the matrix, in this instance the plastic, to produce a direct bond between matrix and ink film. The solvent therefore has to be matched to the matrix to be printed.

Semicrystalline polyamides have excellent resistance to solvents and therefore cannot generally be satisfactorily printed by solvent-containing screen-printing inks. For this reason, for example, screen-printing textiles are produced from polyamides.

By reducing crystallinity, e.g. via incorporation of comonomers, it is possible to improve the capability of polyamides for solvation by the solvents in screen-printing inks. The reduction in crystallinity also simultaneously improves transparency.

However, the possibility of incorporating comonomers to improve the screen-printability and transparency of polyamide films is very restricted in practice, because the conventional solvents in screen-printing inks, examples being nitrodiluents, ethyl acetate, or methyl ethyl ketone, cause stress cracking on the modified polyamide. This causes undesired ink effects (matting) and embrittlement of the film. Embrittlement can especially cause mechanical failure of the film during further processing, i.e. pressing with the item to be decorated.

It was therefore an object to develop a transparent film which has good adhesion to screen-printing inks, without embrittlement during decoration or during further processing.

This object is achieved via a multilayer film which comprises the following layers:

I. an upper layer composed of a polyamide molding composition which is transparent at the selected layer thickness, and
II. a lower layer composed of a polyamide molding composition which comprises the following components:
   a) from 70 to 99% by weight, preferably from 80 to 98% by weight, and particularly preferably from 90 to 97% by weight, of a polyamide selected from
      α) polyamides that can be prepared from lactam monomers or from the corresponding ω-aminocarboxylic acids having 6, 7, 8, 9, 10, 11, or 12 carbon atoms,
      β) polyamides based on diamine and dicarboxylic acids, in each case having from 6 to 18 carbon atoms, e.g. PA6, PA66, PA68, PA610, PA612, PA88, PA810, PA1010, PA1012, or PA1212,
      γ) polyamide elastomers that can be prepared from oligomeric, difunctional units based on one of the polyamides mentioned under α) and β) ($M_n$=from 200 to 10 000, preferably from 600 to 7000, and particularly preferably from 800 to 5000) and on a difunctional oligoalkylene glycol ($M_n$=from 120 to 6000, preferably from 200 to 4000, and particularly preferably from 250 to 2500),
      δ) copolyamides that can be prepared from the following components:
         from 50 to 99.9 mol %, preferably from 60 to 99 mol %, particularly preferably from 70 to 98 mol %, with particular preference from 80 to 97 mol %, and very particularly preferably from 85 to 96 mol % or from 90 to 95 mol %, of a lactam or of the corresponding ω-aminocarboxylic acid having 6, 7, 8, 9, 10, 11, or 12 carbon atoms, or of a substantially equimolar mixture composed of a diamine with a dicarboxylic acid in each case having from 6 to 18 carbon atoms, where diamine and dicarboxylic acid are in each case counted separately in calculations of the formulation, and
         from 0.1 to 50 mol %, preferably from 1 to 40 mol %, particularly preferably from 2 to 30 mol %, with particular preference from 3 to 20 mol %, and very particularly preferably from 4 to 15 mol % or from 4 to 10 mol %, of a substantially equimolar mixture composed of a diamine and of a dicarboxylic acid, where either the diamine or the dicarboxylic acid or both differ from the diamine used, if appropriate, in the other component and, respectively, the dicarboxylic acid used, if appropriate, in the other component, or of a lactam and, respectively, the corresponding ω-aminocarboxylic acid which differ from the lactam used, if appropriate, and, respectively, the corresponding ω-aminocarboxylic acid of the main component. Here again, diamine and dicarboxylic acid are in each case counted separately during calculations of the formulation. In one possible embodiment, either the diamine or the dicarboxylic acid or both are linear, branched, cycloaliphatic, or aromatic;
   b) from 1 to 30% by weight, preferably from 2 to 20% by weight, and particularly preferably from 3 to 10% by weight, of a copolymer which contains units of the following monomers:
      α) from 20 to 94.5% by weight of one or more α-olefins having from 2 to 12 carbon atoms,
      β) from 5 to 79.5% by weight of one or more acrylic compounds, selected from
         acrylic acid and methacrylic acid and salts thereof,
         esters of acrylic acid and, respectively, methacrylic acid with a $C_1$-$C_{12}$ alcohol, where these may, if appropriate, bear a free hydroxyl function or free epoxy function,
         acrylonitrile and methacrylonitrile,
         acrylamides and methacrylamides,
      γ) from 0 to 50% by weight, preferably from 0.1 to 30% by weight, and particularly preferably from 0.5 to 20% by weight, of an olefinically unsaturated epoxide, carboxylic anhydride, carboximide, oxazoline, or oxazinone.

The polyamide molding composition of the layer I. may be either transparent or sufficient translucent to appear transparent at the selected layer thickness. Transparency here means that reverse printing gives efficiently sharp contrast on viewing from above. Any known transparent or translucent polyamide may be used here. In order to provide sufficient resistance to solvent and to stress cracking, the polyamide molding composition of the layer I. is preferably semicrystalline.

By way of example, the polyamide of the layer I. may be produced from the following monomer combination:

α) from 50 to 99.9 mol %, preferably from 60 to 99 mol %, particularly preferably from 70 to 98 mol %, with particular preference from 80 to 97 mol %, and very particularly preferably from 85 to 96 mol % or from 90 to 96 mol %, of a lactam or of the corresponding ω-aminocarboxylic acid having 6, 7, 8, 9, 10, 11, or 12 carbon atoms, or of a substantially equimolar mixture composed of a linear aliphatic diamine with a linear aliphatic or aromatic dicarboxylic acid, where diamine and dicarboxylic acid in each case contain from 6 to 18 carbon atoms and in each case are counted separately in calculations of the formulation, and β) from 0.1 to 50 mol %, preferably from 1 to 40 mol %, particularly preferably from 2 to 30 mol %, with particular preference from 3 to 20 mol %, and very particularly preferably from 4 to 15 mol % or from 4 to 10 mol %, of a substantially equimolar mixture composed of a diamine and of a dicarboxylic acid, where either the diamine or the dicarboxylic acid or both differ from the diamine used, if appropriate, under α) and, respectively, the dicarboxylic acid used, if appropriate, under α), or of a lactam and, respectively, the corresponding ω-aminocarboxylic acid, which differ from the lactam used, if appropriate, and, respectively, the corresponding ω-aminocarboxylic acid of component α). Here again, diamine and dicarboxylic acid are counted separately in each case in calculations of the formulation. In one possible embodiment, either the diamine or the dicarboxylic acid or both is/are linear, branched, cycloaliphatic, or aromatic.

In one preferred embodiment here, the average number of carbon atoms present in component α) in the monomer mixture is from 8 to 12, and particularly preferably from 9 to 12, per monomer.

Suitable diamines of component β) have from 4 to 40 carbon atoms; examples of compounds which may be used here are 1,6-hexamethylenediamine, 2-methyl-1,5-diaminopentane, 2,2,4- or 2,4,4-trimethylhexamethylenediamine, 1,9-nonamethylenediamine, 1,10-decamethylene-diamine, 4,4'-diaminodicyclohexylmethane, 3,3'-dimethyl-4,4'-diaminodicyclohexylmethane, 4,4'-diaminodicyclohexylpropane, 1,4-diaminocyclohexane, 1,4-bis(aminomethyl)cyclo-hexane, 2,6-bis(aminomethyl)norbornane, and 3-aminomethyl-3,5,5-trimethylcyclohexyl-amine. It is also possible to use a mixture of various diamines.

Suitable dicarboxylic acids of component β) likewise have from 4 to 40 carbon atoms; examples here are adipic acid, 2,2,4- or 2,4,4-trimethyladipic acid, azelaic acid, sebacic acid, 1,12-dodecanedioic acid, cyclohexane-1,4-dicarboxylic acid, 4,4'-dicarboxydicyclohexylmethane, 3,3'-dimethyl-4,4'-dicarboxydicyclohexylmethane, 4,4'-dicarboxydicyclohexylpropane, and 1,4-bis(carboxymethyl)cyclohexane. It is also possible to use a mixture of various dicarboxylic acids.

Suitable other lactams and, respectively, corresponding co-aminocarboxylic acids are those having 6, 7, 8, 9, 10, 11, or 12 carbon atoms.

Another example of the polyamide of the layer I. is provided by polyamides that can be prepared from linear aliphatic dicarboxylic acids having from 6 to 14 carbon atoms and a diamine component formulated from
a) from 35 to 60 mol % of trans, trans-bis(4-aminocyclohexyl)methane and
b) from 65 to 40 mol % of other, aliphatic, cycloaliphatic, araliphatic, or aromatic diamines.

These polyamides are disclosed in EP 0 619 336 A2, expressly incorporated herein by way of reference. A particular diamine component used is the isomer mixture of bis(4-aminocyclohexyl)methane.

The molding composition of the layer I. may also be a blend composed of various mutually compatible polyamides, for example of PA12 and PA1012, or composed of one amorphous and one semicrystalline polyamide. By way of example, a mixture composed of PA66 and PA6IT, transparent and semicrystalline at suitable mixing ratios, is suitable. PA6IT is the copolyamide composed of hexamethylenediamine, isophthalic acid, and terephthalic acid.

The molding composition of the layer I. is preferably semicrystalline with a crystallite melting point $T_m$ in the range from 100 to 270° C., preferably from 120 to 220° C., and particularly preferably from 140 to 200° C. The enthalpy of fusion of the molding composition is preferably at least 10 J/g, and particularly preferably at least 15 J/g, at least 20 J/g, at least 25 J/g, at least 30 J/g, at least 35 J/g, at least 40 J/g, at least 45 J/g, at least 50 J/g, or at least 55 J/g. $T_m$ and enthalpy of fusion are determined via DSC to ISO 11357 in the $2^{nd}$ heating curve, using a heating rate of 20 K/min.

The thickness of the layer I. is generally in the range from 0.02 to 1 mm, preferably in the range from 0.05 to 0.8 mm, particularly preferably in the range from 0.1 to 0.6 mm, with particular preference in the range from 0.2 to 0.5 mm, and very particularly preferably in the range from 0.3 to 0.5 mm.

The polyamides and, respectively, copolyamides and polyamide elastomers of the layer II. and their preparation are prior art.

The polyamide II. a) α) is preferably based on monomers having 8, 9, 10, 11, or 12 carbon atoms.

The average number of carbon atoms present in the monomer units in the polyamide II. a) β) is preferably from 8 to 12 and particularly preferably from 9 to 12.

The polyamide elastomer II. a) γ) may in particular be a polyetheramide or a polyetheresteramide. The polyetheramide can be prepared either from polyamide units having two carboxyl end groups and oligoalkylene glycol having two amino end groups, or from polyamide units having two amino end groups and oligoalkylene glycol having two carboxyl end groups. Correspondingly, polyetheresteramides can be prepared via reaction of a polyamide unit having two carboxyl end groups and oligoalkylene glycol having two hydroxyl end groups. The alkylene in the oligoalkylene glycol is generally ethylene, 1,2-propylene, 1,3-propylene, 1,2-butylene, or 1,4-butylene, and the oligoalkylene glycol here may be a homopolymer or a copolymer. In one preferred embodiment, the number of carbon atoms per oxygen atom in the oligoalkylene glycol is more than 2.3 on average. With respect to suitable polyamide elastomers, reference may be made, by way of example, to EP 1 329 481 A2, or DE-A 103 33 005, and also the references mentioned therein.

The average number of carbon atoms in the monomer units of the main component in the copolyamide II. a) δ) is preferably from 8 to 12 and particularly preferably from 9 to 12.

Suitable diamines of the second component have from 4 to 40 carbon atoms; examples of compounds used here are 1,6-hexamethylenediamine, 2-methyl-1,5-diaminopentane, 2,2,4- or 2,4,4-trimethylhexamethylenediamine, 1,9-nonamethylenediamine, 1,10-decamethylenediamine, 4,4'-diaminodicyclohexylmethane, 3,3'-dimethyl-4,4'-diaminodicyclohexylmethane, 4,4'-diaminodicyclohexylpropane, 1,4-diaminocyclohexane, 1,4-bis(aminomethyl)cyclohexane, 2,6-bis(aminomethyl)norbornane, and 3-aminomethyl-3,5,5-trimethylcyclohexylamine. It is also possible to use a mixture of various diamines.

Suitable dicarboxylic acids of the second component likewise have from 4 to 40 carbon atoms; examples here are adipic acid, 2,2,4- or 2,4,4-trimethyladipic acid, azelaic acid, sebacic acid, 1,12-dodecanedioic acid, cyclohexane-1,4-dicarboxylic acid, 4,4'-dicarboxydicyclohexylmethane, 3,3'-dimethyl-4,4'-dicarboxydicyclohexylmethane, 4,4'-dicarboxydicyclohexylpropane, and 1,4-bis(carboxymethyl)cyclohexane. It is also possible to use a mixture of various dicarboxylic acids.

The molded composition of the layer II. may, of course, also comprise a polyamide mixture in any desired mixing ratio, examples being the types α) and β) (for example PA12 and PA1012), the types α) and γ), the types β) and γ), or the types δ) and γ).

By way of example, the copolymer II. b) has been formulated from the following monomers, the list here being non-exhaustive:
a) α-olefins, such as ethylene, propene, 1-butene, 1-pentene, 1-hexene, 1-octene, 1-decene, or 1-dodecene;
b) acrylic acid, methacrylic acid, or salts thereof, for example with $Na^{\oplus}$ or $Zn^{2\oplus}$ as counterions; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate, 2-ethylhexyl methacrylate, hydroxyethyl acrylate, 4-hydroxybutyl methacrylate, glycidyl acrylate, glycidyl methacrylate, acrylonitrile, methacrylonitrile, acrylamide, N-methylacrylamide, N,N-dimethylacrylamide, N-ethylacrylamide, N-hydroxyethylacrylamide, N-propylacrylamide, N-butylacrylamide, N-(2-ethylhexyl)acrylamide, methacrylamide, N-methylmethacrylamide, N,N-dimethylmethacrylamide, N-ethylmethacrylamide, N-hydroxyethylmethacrylamide, N-propylmethacrylamide, N-butylmethacrylamide, N,N-dibutylmethacrylamide, N-(2-ethylhexyl)methacrylamide;
c) vinyloxirane, allyloxirane, glycidyl acrylate, glycidyl methacrylate, maleic anhydride, aconitic anhydride, itaconic anhydride, and the dicarboxylic acids produced from these anhydrides via reaction with water; maleimide, N-methylmaleimide, N-ethylmaleimide, N-butylmaleimide, N-phenylmaleimide, aconitimide, N-methylaconitimide, N-phenylaconitimide, itaconimide, N-methylitaconimide, N-phenylitaconimide, N-acryloylcaprolactam, N-methacryloylcaprolactam, N-acryloyllaurolactam, N-methacryloyllaurolactam, vinyloxazoline, isopropenyloxazoline, allyloxazoline, vinyloxazinone, or isopropenyloxazinone. If glycidyl acrylate or glycidyl methacrylate is used, these also function simultaneously as acrylic compound b), and therefore no further acrylic compound need be present if the amount of glycidyl(meth)acrylate is sufficient.

The formulation of the copolymer in this specific embodiment is
a) from 20 to 94.5% by weight of one more α-olefins having from 2 to 12 carbon atoms,
b) from 0 to 79.5% by weight of one or more acrylic compounds selected from
acrylic acid and methacrylic acid and salts thereof,
esters of acrylic acid and, respectively, methacrylic acid with a $C_1$-$C_{12}$ alcohol,
acrylonitrile and methacrylonitrile,
acrylamides and methacrylamides,
c) from 0.5 to 80% by weight of an ester of acrylic acid or methacrylic acid, where the ester contains an epoxy group, where the entirety of b) and c) gives at least 5.5% by weight.

The copolymer may moreover contain a small amount of further copolymerized monomers as long as these do not significantly impair properties, examples being dimethyl maleate, dibutyl fumarate, diethyl itaconate, or styrene.

The preparation of these copolymers is prior art. Many different types of these are commercially available products, for example with the name LOTADER® (Elf Atochem; ethylene-acrylate-tercomponent or ethylene-glycidyl methacrylate).

The thickness of the layer II. is generally from 0.02 to 0.6 mm, preferably from 0.05 to 0.4 mm, particularly preferably from 0.1 to 0.3 mm, and with particular preference from 0.1 to 0.2 mm. At this thickness, the molding composition has good transparency.

The molding compositions of the layer I. and II. may comprise further additives, as long as no substantial impairment of transparency results, examples being rubbers, such as isorefractive acrylate rubbers, and also conventional auxiliaries and additives in the amounts conventional for polyamide molding compositions, examples being stabilizers, lubricants, dyes, or nucleating agents, preferably those selected from nanoscale fillers and metal salts, metal oxides, or metal hydroxides which can react with the carboxyl groups present in the molding composition.

The film may moreover comprise further layers, for example an adhesion-promoter layer for linkage to the substrate or for bonding within the multilayer film structure. If necessary, for example if scratch resistance requirements are stringent, the outer layer may, if appropriate, also have been provided with a protective layer, for example with a clear lacquer based on polyurethane. It may also, if appropriate, have been covered with an assembly film which is peeled away after production of the finished part.

The inventive film can give excellent results when decorated via printing, preferably by means of screen or offset printing on the outward-facing side of the layer II.

Examples of the use of the films are as protective film with respect to soiling, UV radiation, weathering effects, chemicals, or abrasion, as barrier film on vehicles, in the household, on floors, on tunnels, on tents, and on buildings, or as a carrier for decorative effects, for example for overcoatings on sports equipment, or internal or external decoration on motor vehicles, on boats, in the household, or on buildings. Examples of methods for producing the cohesive bond between film and substrate are adhesive bonding, pressing, lamination, coextrusion, or in-mold coating. To achieve improved adhesion, the film may be pre-flame-treated or pre-plasma-treated, for example.

In one preferred embodiment, the inventive film is used as overcoating for any type of snowboard-like equipment, such as skis or snowboards.

The invention is illustrated below by examples.

COMPARATIVE EXAMPLE 1

A copolyamide composed of laurolactam (85 mol %), isophoronediamine (7.5 mol %), and 1,12-dodecanedioic acid (7.5 mol %) with a crystallite melting point $T_m$ of 163° C. in the form of a monofilm of thickness 0.4 mm exhibited good adhesion to screen-printing inks and epoxy-resin adhesive compositions, and also good transparency. However, the film embrittled on printing and, respectively, on treatment with the adhesive composition.

COMPARATIVE EXAMPLE 2

A molding composition composed of 66.5% by weight of a polyetheresteramide with $T_m$ of 171° C., formulated from PA12 blocks whose number-average molecular weight is about 4300 and from oligotetrahydrofuran blocks whose number-average molecular weight is about 1000, 28.5% by weight of a PA12, and 5% by weight of an ethylene-co-acrylic acid copolymer (ESCOR® 5200 from Exxon Mobil Chemicals) having an acrylic acid fraction of 15% by weight, in the form of a monofilm of thickness 0.4 mm, exhibited good adhesion to screen-printing inks and to epoxy-resin adhesive compositions, and did not embrittle at all on printing and, respectively, on treatment with the adhesive composition. However, the transparency of the film was evaluated as at best "adequate".

INVENTIVE EXAMPLE 1

A two-layer film was produced from the copolyamide of Comparative example 1 (layer thickness 0.3 mm) and the molding composition of Comparative example 2 (layer thickness 0.1 mm). The film had good transparency; after printing by means of screen printing and adhesive bonding using epoxy-resin adhesive composition (both on the side of the molding composition of Comparative example 2), the film exhibited good adhesion to the screen-printing inks and to the epoxy-resin adhesive composition, and exhibited no embrittlement at all.

The examples show that an excellent compromise between printability and adhesive-bondability on the one hand and transparency on the other hand can be achieved with the aid of the inventive multilayer film.

What is claimed is:

1. A transparent multilayer film which consists of the following layers:
   I. an upper layer consisting essentially of a semicrystalline polyamide molding composition which has a crystallite melting point of from 100 to 270° C. and an enthalpy of fusion of at least 10 J/g, wherein the upper layer has a thickness such that it is transparent or is translucent but appears transparent, wherein layer I comprises either (1) a mixture of PA66 and PA6IT, or (2) a semicrystalline polyamide prepared from a monomer mixture comprising:
      α) from 50 to 99 mol % (i) of a lactam or of a corresponding co-aminocarboxylic acid having 6, 7, 8, 9, 10, 11, or 12 carbon atoms, or (ii) of a substantially equimolar mixture composed of a linear aliphatic diamine with a linear aliphatic or aromatic dicarboxylic acid, where diamine and dicarboxylic acid in each case contains from 6 to 18 carbon atoms, and
      β) from 1 to 50 mol % of a substantially equimolar mixture composed of a linear aliphatic diamine with a linear aliphatic or aromatic dicarboxylic acid, where diamine and dicarboxylic acid in each case contains from 6 to 18 carbon atoms, except that if component α) is (ii), component β) differs therefrom, and
   II. a lower layer comprising a polyamide molding composition which comprises the following components:
      a) from 80 to 99% by weight of a polyamide selected from
         α) polyamides that can be prepared from lactam monomers or from the corresponding co-aminocarboxylic acids having 6, 7, 8, 9, 10, 11, or 12 carbon atoms,
         β) polyamides based on diamine and dicarboxylic acids, in each case having from 6 to 18 carbon atoms,
         γ) polyamide elastomers that can be prepared from oligomeric, difunctional units based on one of the polyamides of α) and β), and on a difunctional oligoalkylene glycol,
         δ) copolyamides that can be prepared from the following components:
            (i) from 50 to 99.9 mol % of a lactam monomer or of the corresponding ω-aminocarboxylic acid having 6, 7, 8, 9, 10, 11, or 12 carbon atoms, or of a substantially equimolar mixture composed of a linear aliphatic diamine and of a linear aliphatic or aromatic dicarboxylic acid in each case having from 6 to 18 carbon atoms, and
            (ii) from 0.1 to 50 mol % of a lactam monomer or of the corresponding ω-aminocarboxylic acid having 6, 7, 8, 9, 10, 11, or 12 carbon atoms, or of a substantially equimolar mixture composed of a linear aliphatic diamine and of a linear aliphatic or aromatic dicarboxylic acid in each case having from 6 to 18 carbon atoms, wherein component (ii) differs from component (i),
      b) from 1 to 20% by weight of a copolymer which comprises units of the following monomers:
         α) from 20 to 94.5% by weight of one or more α-olefins having from 2 to 12 carbon atoms,
         β) from 5 to 79.5% by weight of one or more acrylic compounds, selected from
            acrylic acid and methacrylic acid and salts thereof,
            esters of acrylic acid and, respectively, methacrylic acid with a $C_1$-$C_{12}$ alcohol, where these may optionally bear a free hydroxyl function or free epoxy function,
            acrylonitrile and methacrylonitrile,
            acrylamides and methacrylamides,
         γ) from 0 to 50% by weight of an olefinically unsaturated epoxide, carboxylic anhydride, carboximide, oxazoline, or oxazinone.

2. The film as claimed in claim 1, wherein the thickness of the layer I. is from 0.02 to 1 mm, and the thickness of the layer II. is from 0.02 to 0.6 mm.

3. A ski or snowboard coated with the film as claimed in claim 1.

4. The film as claimed in claim 1, wherein layer IIa) comprises α).

5. The film as claimed in claim 1, wherein layer IIa) comprises β).

6. The film as claimed in claim 1, wherein layer IIa) comprises γ).

7. The film as claimed in claim 6, wherein layer IIb) β) comprises acrylic acid.

8. The film as claimed in claim 1, wherein layer IIa) comprises δ).

9. The film as claimed in claim 1, wherein layer IIb) β) comprises acrylic acid.

10. The film as claimed in claim 1, wherein said semicrystalline polyamide is present and is prepared from a monomer mixture comprising from 85 to 96 mol % of α) and from 4 to 15 mol % of β).

11. The film as claimed in claim 1, wherein said semicrystalline polyamide is present and is prepared from a monomer mixture comprising from 90 to 96 mol % of α) and from 4 to 10 mol % of β).

12. The film as claimed in claim 1, wherein the thickness of the layer I. is from 0.3 to 0.5 mm, and the thickness of the layer II. is from 0.1 to 0.2 mm.

13. The film as claimed in claim 1, wherein the crystallite melting point is from 120 to 220° C.

14. The film as claimed in claim 1, wherein the crystallite melting point is from 140 to 200° C.

15. The film as claimed in claim 1, wherein the enthalpy of fusion is at least 55 J/g.

16. The film as claimed in claim 1, wherein layer I comprises the mixture of PA66 and PA6IT.

17. The film as claimed in claim 1, wherein layer I comprises the semicrystalline polyamide prepared from the monomer mixture comprising α) (i) and β).

18. The film as claimed in claim 1, wherein layer I comprises the semicrystalline polyamide prepared from the monomer mixture comprising α)(ii) and β).

* * * * *